United States Patent

Kobayashi et al.

[11] Patent Number: 5,615,754
[45] Date of Patent: Apr. 1, 1997

[54] DISC BRAKE

[75] Inventors: Kinzo Kobayashi; Shinichi Izumi; Shinji Suzuki; Shinichi Nakayama, all of Yamanashi-ken, Japan

[73] Assignee: Tokico Ltd., Japan

[21] Appl. No.: 405,875

[22] Filed: Mar. 17, 1995

[30] Foreign Application Priority Data

Mar. 18, 1994 [JP] Japan .................... 6-049533
Mar. 18, 1994 [JP] Japan .................... 6-049534

[51] Int. Cl.$^6$ .................... F16D 55/224; F16D 65/02
[52] U.S. Cl. .................... 188/73.35; 188/72.5; 188/370; 188/73.37; 92/172
[58] Field of Search .................... 188/72.5, 72.4, 188/370, 73.35, 218 A, 106 P, 366, 367, 364, 73.37, 73.36, 71.3; 92/172

[56] References Cited

U.S. PATENT DOCUMENTS

| | | | |
|---|---|---|---|
| 3,424,276 | 1/1969 | Rubinette | 188/370 |
| 3,734,248 | 5/1973 | Fay | 188/72.4 |
| 3,779,348 | 12/1973 | Farr | 188/364 |
| 3,921,767 | 11/1975 | Yokoi | 188/364 |
| 4,022,302 | 5/1977 | Janssen | 188/73.1 |
| 4,064,974 | 12/1977 | Filderman | 188/71.3 |
| 4,086,985 | 5/1978 | Cunnell | 188/370 |
| 4,170,926 | 10/1979 | Emmett | 188/370 |
| 4,286,504 | 9/1981 | Carre et al. | 188/364 |
| 4,294,336 | 10/1981 | Shimizu | 188/72.4 |
| 4,299,311 | 11/1981 | Shirai et al. | 188/106 P |
| 4,535,875 | 8/1985 | Ingram et al. | 188/343 |
| 4,705,146 | 11/1987 | Tarter | 188/218 A |
| 4,875,556 | 10/1989 | Shaw et al. | 188/73.37 |
| 5,014,827 | 5/1991 | Wang et al. | 188/72.4 |
| 5,024,298 | 6/1991 | Schenk et al. | 188/72.5 |
| 5,099,961 | 3/1992 | Dreilich et al. | 188/73.37 |
| 5,105,917 | 4/1992 | Sporzynski et al. | 188/370 |
| 5,277,279 | 1/1994 | Shimura | 188/72.5 |
| 5,363,943 | 11/1994 | Iwashita et al. | 188/72.5 |
| 5,386,890 | 2/1995 | Itsuaki | 188/73.35 |

FOREIGN PATENT DOCUMENTS

| | | | |
|---|---|---|---|
| 47881 | 4/1966 | Germany | 188/370 |
| 4613691 | 10/1966 | Japan | 188/72.4 |
| 54141956 | 11/1979 | Japan | 188/73.37 |
| 1295032 | 11/1989 | Japan | 188/72.4 |
| 5106661 | 4/1993 | Japan | 188/72.5 |
| 5288229 | 11/1993 | Japan | 188/72.5 |
| 386954 | 4/1921 | United Kingdom | 188/364 |
| 311015 | 5/1929 | United Kingdom | 188/364 |
| 2115507 | 9/1983 | United Kingdom | 188/72.4 |

*Primary Examiner*—Douglas C. Butler
*Attorney, Agent, or Firm*—Wenderoth, Lind & Ponack

[57] ABSTRACT

A disc brake having a plurality of pistons with the same outer diameter fitted in a cylinder portion of a caliper on at least one side of a disc so that the pistons cause a pad to press against the disc. At least one of the pistons has a relatively large wall thickness so that it is different from the other pistons in pad pressing area, and its natural frequency falls outside the range of from 20 Hz to 20 kHz, thereby suppressing the generation of brake noise.

2 Claims, 19 Drawing Sheets

DISC BRAKE

BACKGROUND OF THE INVENTION

The present invention relates to disc brakes and, more particularly, to a disc brake capable of suppressing generation of brake noise.

A known disc brake uses a caliper which has a cylinder portion, a disc-pass portion extending from the cylinder portion across a disc, and a claw portion extending radially inward of the disc from the outer end of the disc-pass portion, A piston is accommodated in the cylinder portion of the caliper, The piston causes one pad to press against one side of the disc, and by the counterforce that is produced at this time, the other pad is pressed against the other side of the disc through the claw portion, thereby obtaining braking force, The piston used in such a known disc brake is a cylindrical piston, one end of which is open and the other end of which is closed, The wall of the piston has a minimum thickness within the range in which the required mechanical strength can be obtained from the viewpoint of minimizing the weight, Accordingly, the open end surface of the piston, which contacts one pad, has the shape of a ring with a narrow width.

Further, shims, which are each formed by coating rubber on the obverse and reverse surfaces of an iron plate, have heretofore been used to prevent the generation of brake noise. That is, for the outer pad, a shim is interposed between the pad and the claw portion Of the caliper, and for the inner pad, another shim is interposed between the pad and the piston, thereby buffering vibration which creates noise. It should be noted that, for the inner pad, since the open end surface of the piston, which has the shape of a ring with a narrow width, is likely to damage the rubber coating of the shim, a thin stainless steel plate is additionally interposed between the shim and the piston to protect the rubber coating of the shim.

The conventional disc brake, which is provided with shims and a thin plate to buffer vibration as described above, suffers from the problem that the number of constituent elements disadvantageously increases.

In addition, it has been revealed that, since the natural frequency of the above-described thin-walled piston is about 7.2 kHz, which falls within the audible frequency range, if the frequency of vibration occurring between the disc and the pads coincides with the natural frequency, brake noise is generated.

In view of the above-described circumstances, it is an object of the present invention to provide a disc brake capable of preventing the generation of brake noise which would otherwise occur when the frequency of vibration occurring between the disc and the pads coincides with the natural frequency for the piston, without the need of providing a shim and a thin plate.

SUMMARY OF THE INVENTION

The present invention provides a disc brake having a piston fitted in a cylinder portion of a caliper so that the piston causes a pad to press against a disc. The piston has a natural frequency outside the range of from 20 Hz to 20 kHz.

In addition, the present invention provides a disc brake having a plurality of pistons with the same outer diameter fitted in a cylinder portion of a caliper on at least one side of a disc so that the pistons cause a pad to press against the disc. At least one of the pistons is different from the others in either pad pressing area or pad pressing position with respect to the radial direction thereof.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements.

DETAILED DESCRIPTION

Prior to the description of the present invention, conventional disc brakes will be explained with reference to FIGS. 16 to 20 for the purpose of facilitating the understanding of the present invention.

Figure 16:
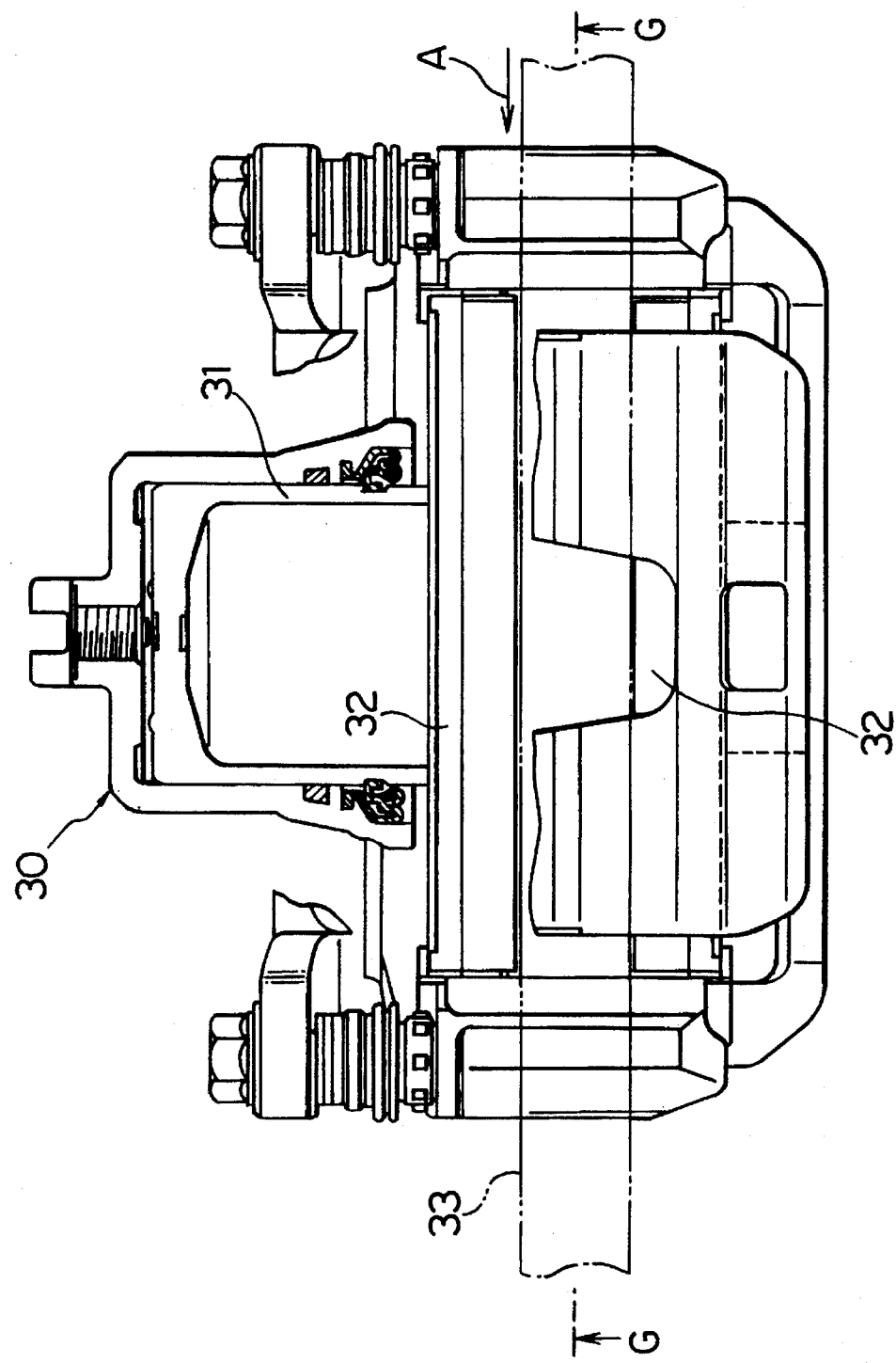
FIG. 16 is a partly-sectioned plan view of a conventional disc brake.
Figure 17:
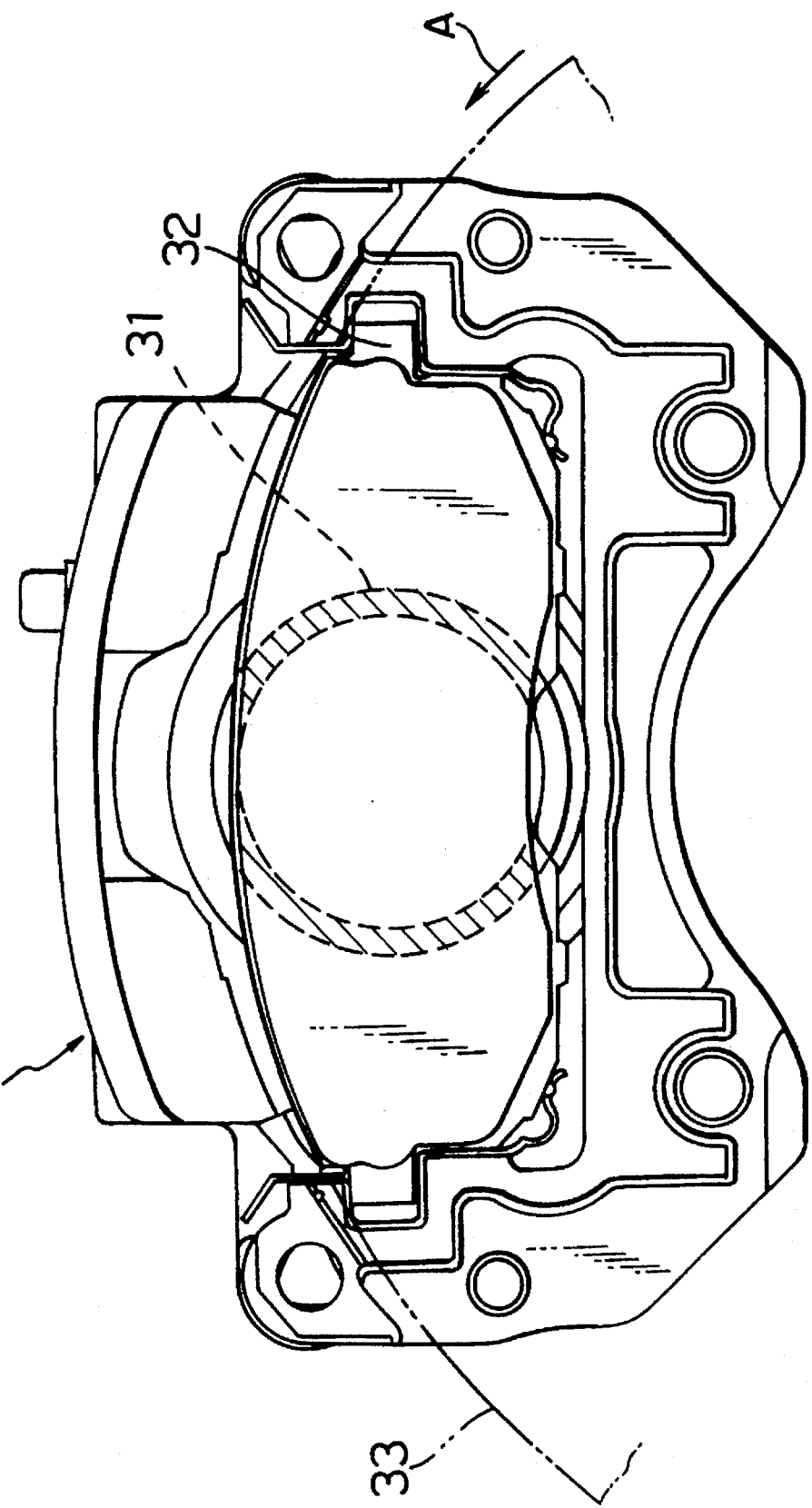
FIG. 17 is a sectional view as seen in the direction of the arrow G—G in FIG. 16, showing the conventional disc brake.

FIGS. 16 and 17 show a conventional disc brake wherein a caliper 30 is fitted with a piston 31 so that the piston 31 presses pads 32 toward a disc 33. The piston 31 used in the conventional disc brake is a cylindrical piston one end is open, while the other end of which is closed. The piston 31 contacts the pads 32 at the open end surface thereof to press on it. The wall of the piston 31 has a minimum thickness within a range in which the required mechanical strength can be ensured from the view-point of minimizing the weight. Accordingly, the open end surface of the piston 31, which contacts one pad 32, has the shape of a ring with a narrow width.

Figure 18:
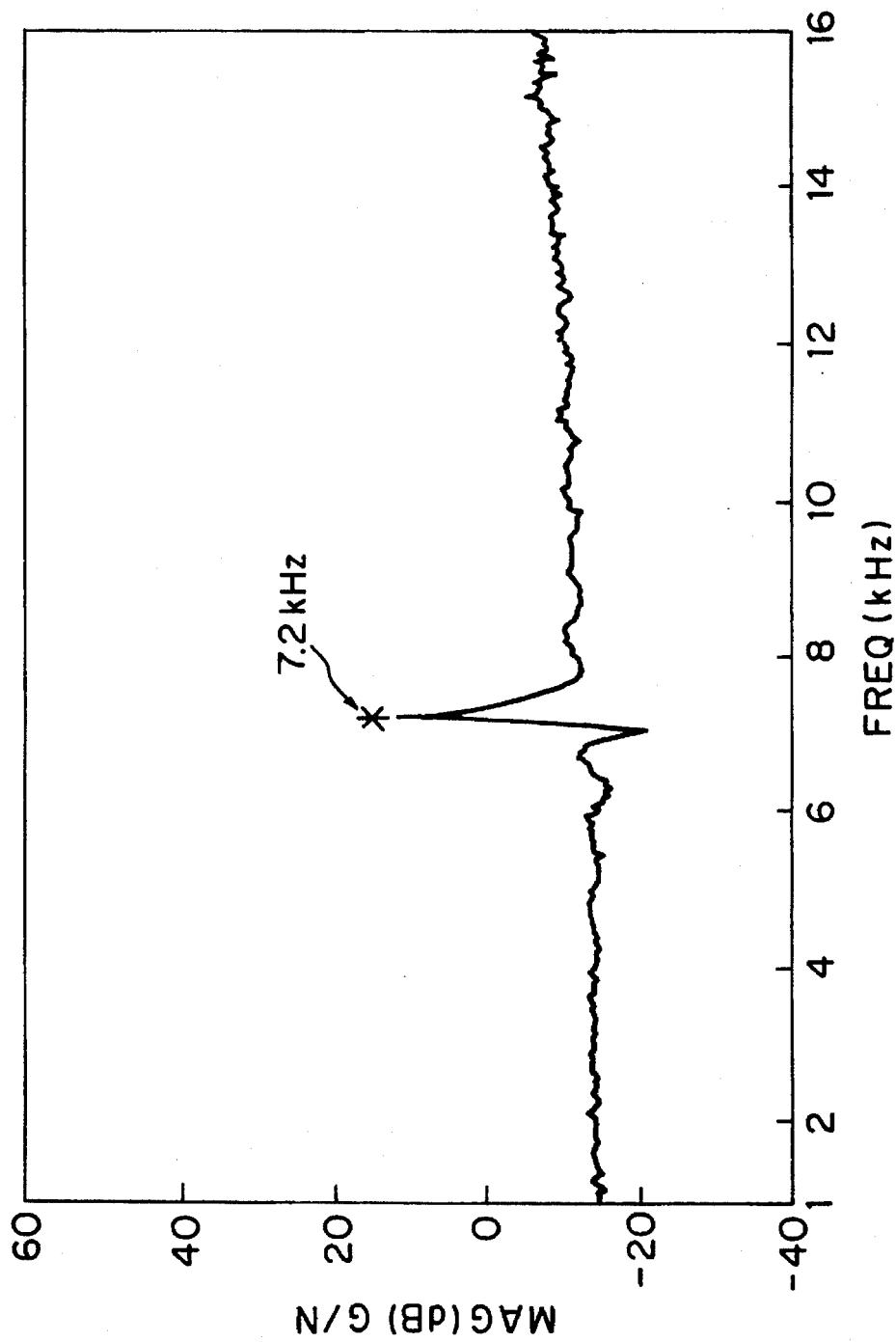
FIG. 18 is a graph showing vibration characteristics of a piston used in the conventional disc brake.

The natural frequency of the thin-walled piston 31, shown in FIGS. 16 and 17, is, for example, 7.2 kHz, which falls within the audible frequency range, as shown in FIG. 18. Therefore, when the frequency of vibration occurring between the disc 33 and the pads 32 coincides with the natural frequency of the piston 31, brake noise is generated.

Further, since the width of the open end surface of the piston 31 is narrow, the associated shim is likely to be damaged, as described above.

Figure 19:
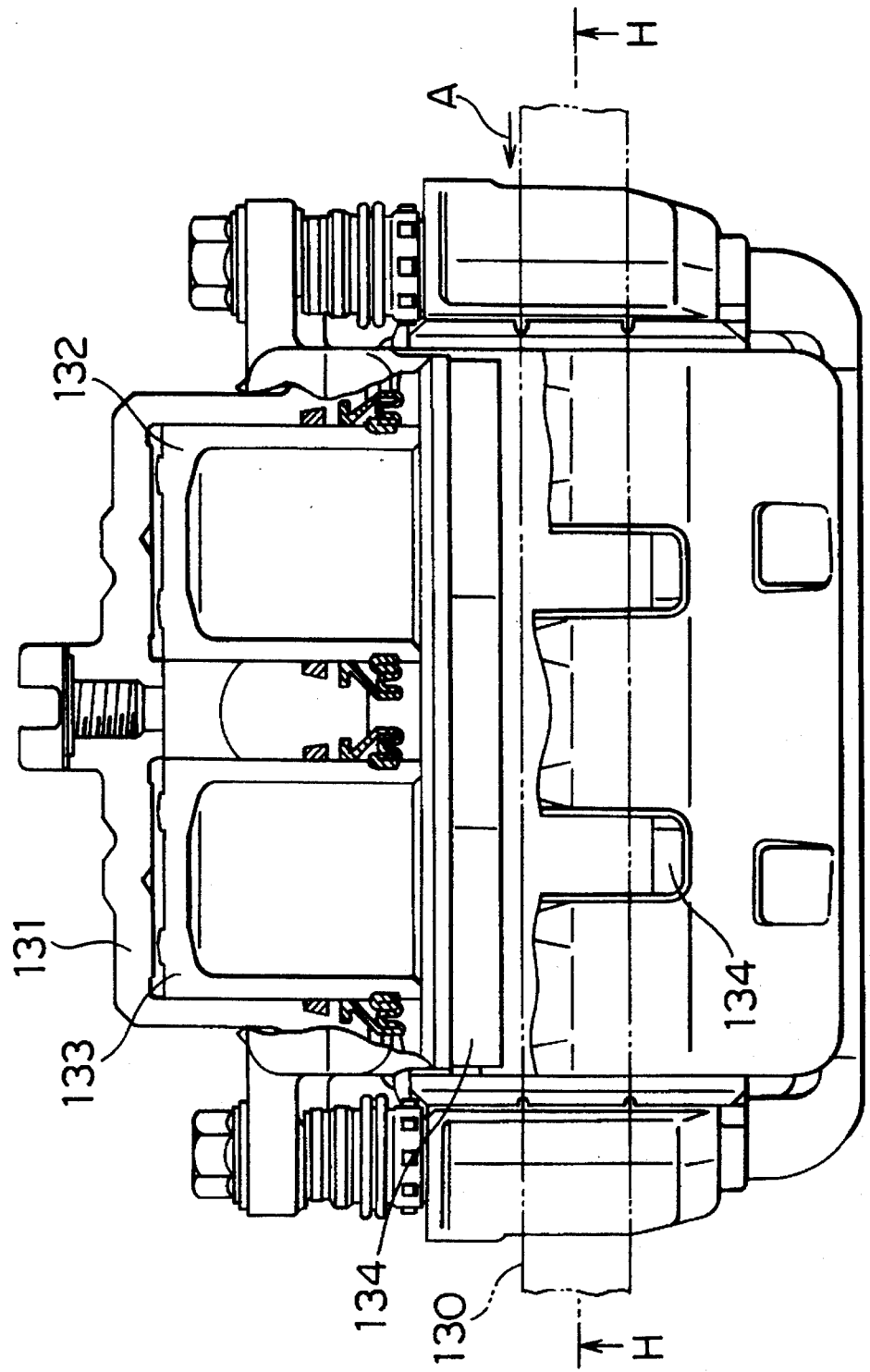
FIG. 19 is a partly-sectioned plan view showing a conventional disc brake having two pistons.
Figure 20:
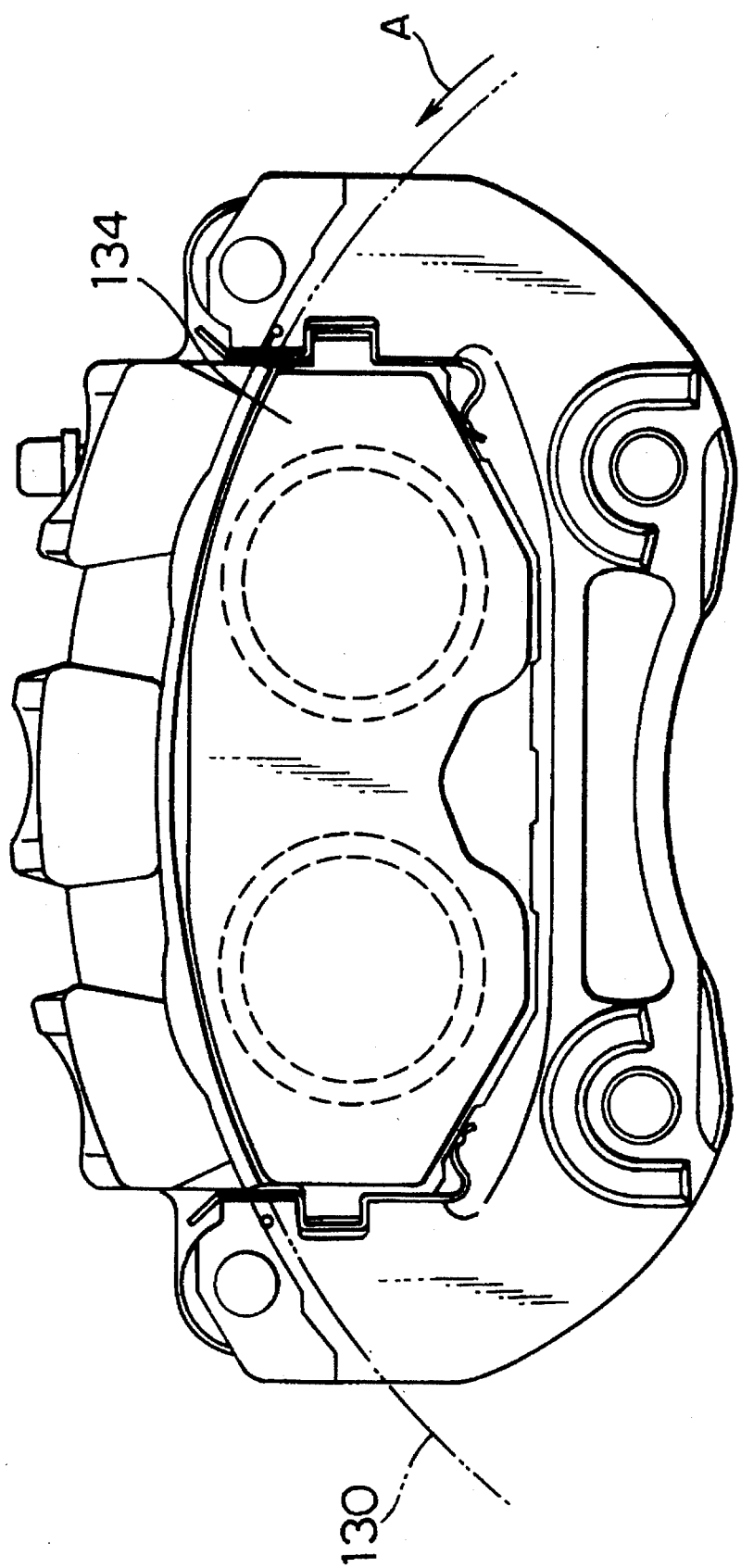
FIG. 20 is a sectional view as seen in the direction of the arrow H—H in FIG. 19, showing the conventional disc brake.

FIGS. 19 and 20 show a conventional disc brake in which a caliper 131 that is disposed at one side of a disc 130 is fitted with a plurality of pistons 132 and 133 having the same diameter so that the pistons 132 and 133 press pads 134 toward a disc 130. All the pistons 132 and 133 used in this conventional disc brake have the same configuration.

On account of moment acting on the pads during braking operation, the force with which the pads press against the disc is larger at the inlet side than at the outlet side in the direction of rotation of the disc. Thus, since the surface pressure is not uniform, when a plurality of pistons of the same configuration are used, vibration may occur at an end portion of each pad which is closer to the outlet side in the disc rotation direction. On the other hand, when a plurality of pistons of the same configuration are used, an end portion of the pad which is closer to the inlet side in the disc rotation direction is likely to cause stick-slip on the disc. Vibration at the outlet-side end portion of the pad and stick-slip at the inlet-side end portion of the pad may cause brake noise.

Next, a first embodiment of the disc brake according to the present invention will be described with reference to FIGS. 1 to 3. It should be noted that the term "disc rotation direction" in the following description means the direction of rotation of the disc when the vehicle moves forward. Further, in the drawings the open end surface of a piston that contacts a pad is hatched.

Figure 1:
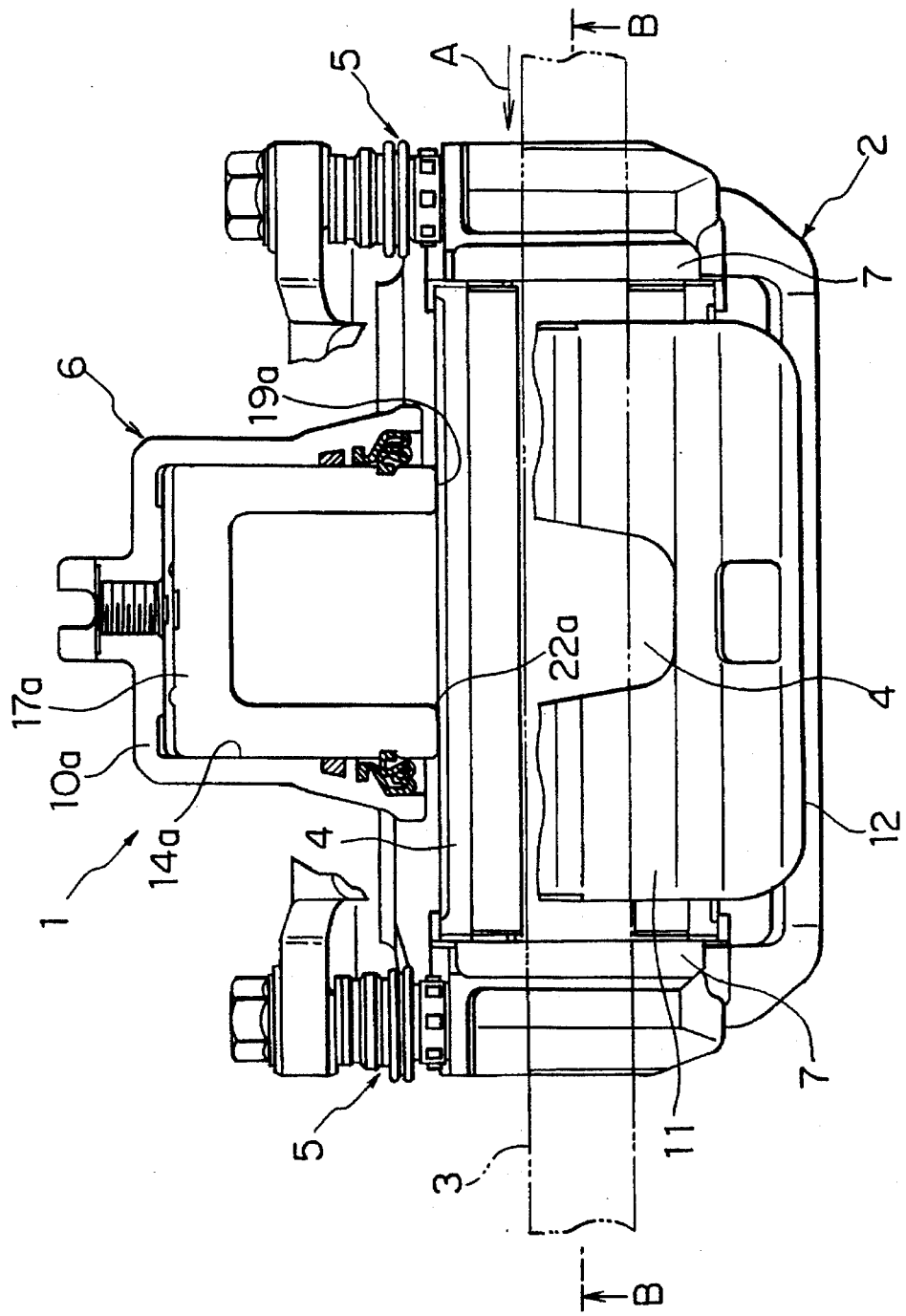
FIG. 1 is a partly-sectioned plan view showing a first embodiment of the disc brake according to the present invention.
Figure 2:
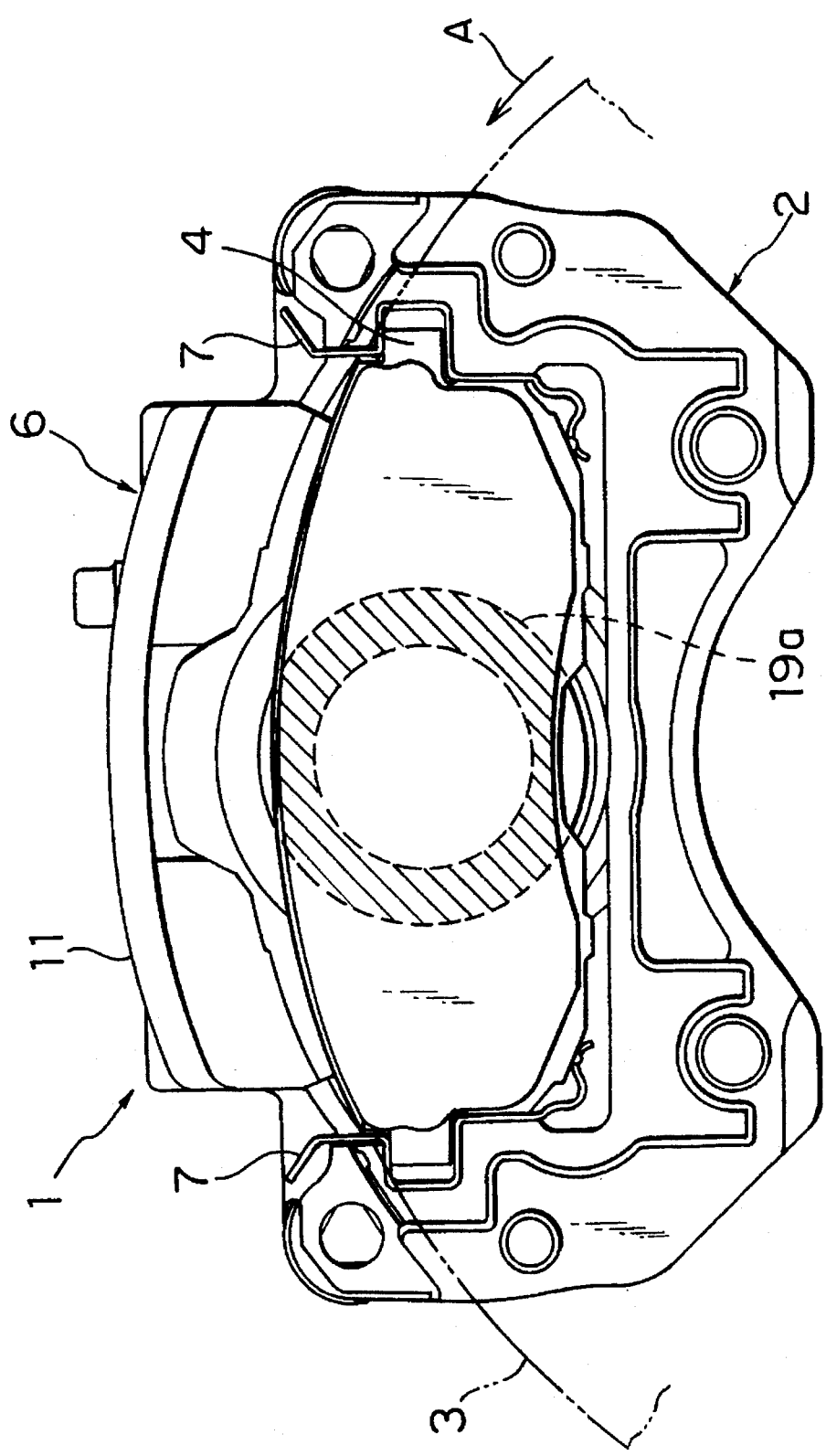
FIG. 2 is a sectional view as seen in the direction of the arrow B—B in FIG. 1, showing the first embodiment of the disc brake according to the present invention.
Figure 3:
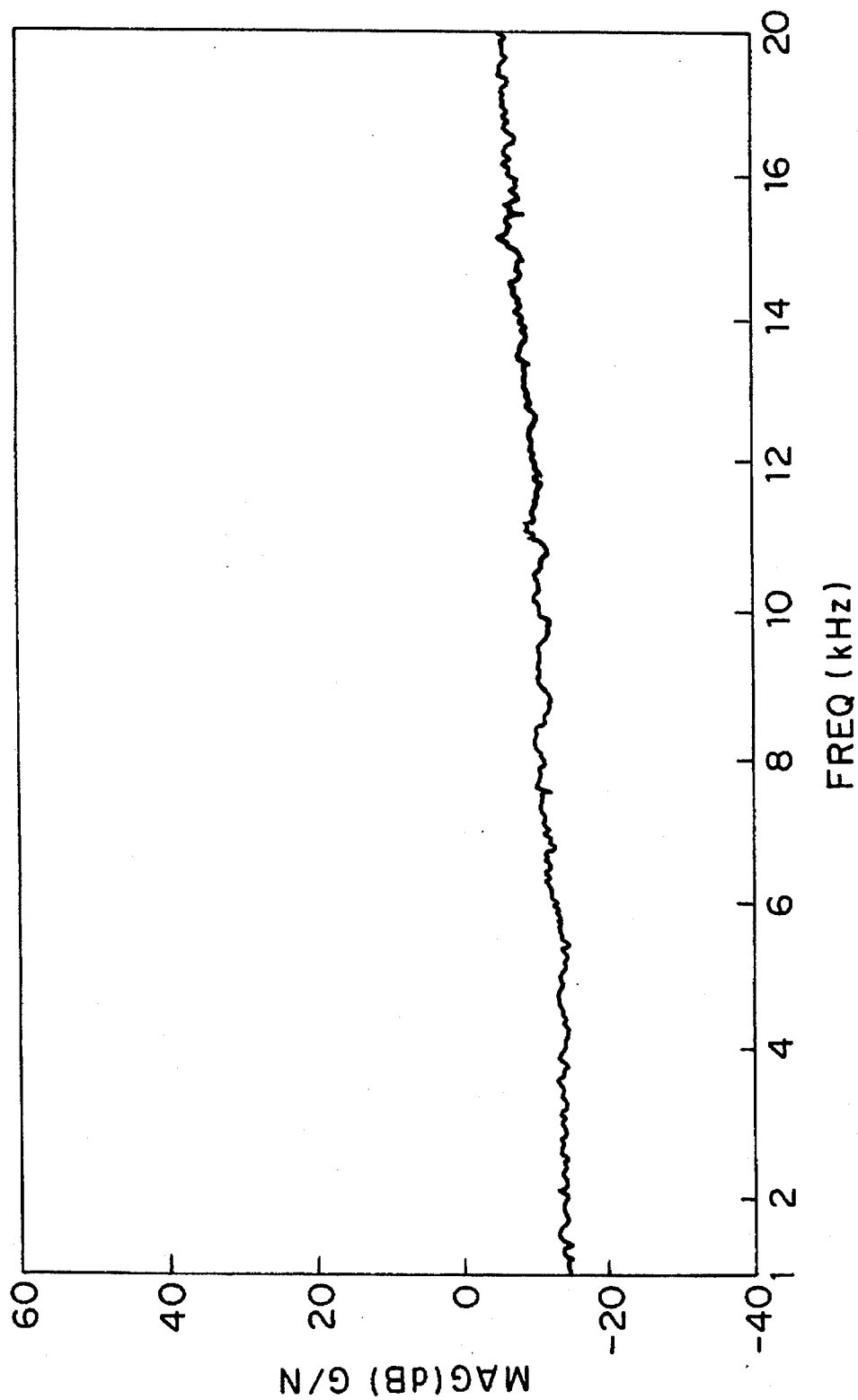
FIG. 3 is a graph showing vibration characteristics of a piston used in the first embodiment of the disc brake according to the present invention.

Referring to FIGS. 1 to 3, a disc brake 1 is composed mainly of a carrier 2 secured to a non-rotating part of a vehicle, a pair of pads 4 disposed on the carrier 2 so as to sandwich a disc 3 therebetween, and a caliper 6 supported on the carrier 2 so as to be slidable in the axial direction of the disc 3 through two slide guide portions 5. The two pads 4 are supported by a pair of opposed pad guides 7 provided at the respective inner sides of the slide guide portions 5 of the carrier 2 so that the pads 4 are slidable in the axial direction of the disc 3. The disc 3 rotates in the direction of the arrow A shown in the drawings.

The caliper 6 has a cylinder portion 10a disposed at one side of the disc 3 so as to face it, a disc-pass portion 11 extending from one end of the cylinder portion 10a across the outer peripheral portion of the disc 3, and a claw portion 12 extending from the outer end of the disc-pass portion 11 so as to face the other side of the disc 3.

The cylinder portion 10a is provided with a bore 14a having a circular cross-sectional configuration such that the bore 14a opens to the disc 3. The bore 14a is provided so that the axis thereof extends parallel to the axis of the disc 3.

The bore 14a is slidably fitted with a cylindrical piston 17a one end of which is closed, in such a manner that the bottom of the piston 17a faces away from the disc 3.

When brake fluid is introduced into a chamber defined between the piston 17a and the bore 14a, the planar open end surface 19a of the piston 17a comes in contact with the backing plate of the pad 4 which is opposite thereto. As brake fluid is further introduced, the piston 17a clamps the two pads 4 from both sides in cooperation with the claw portion 12, thereby pressing the pads 4 toward the disc 3. Thus, the two pads 4 are brought into contact with the disc 3 to cause friction therebetween, thereby slowing the rotation of the wheel down to brake the vehicle.

In the first embodiment, the inner diameter of the piston 17a and its depth from the open end surface 19a to the bottom are smaller than those of the piston used in the conventional disc brake shown in FIGS. 16 and 17. The outer diameter and axial length of the piston 17a are the same as those of the piston of the conventional disc brake. Thus, the piston 17a has a relatively thick wall as a whole. Accordingly, the open end surface 19a has the shape of a ring having a relatively large width. It should be noted that the inner peripheral edge of the open end surface 19a of the piston 17a is chamfered as shown by reference numeral 22a.

With the disc brake of this embodiment, the wall thickness of the piston 17a is increased so that the natural frequency of the piston 17a can be set outside the frequency range of from 20 Hz to 20 kHz and, thus outside the audible frequency range. Thus, even when the pads 4 cause vibration in the audible frequency range, it is possible to prevent the piston 17a from vibrating in resonance.

Accordingly, it is possible to substantially prevent generation of brake noise which would otherwise occur when the frequency of vibration occurring between the disc 3 and the pads 3 coincides with the natural frequency of the piston 17a, without the need of providing a shim and a thin plate. Thus, it is possible to minimize the number of constituent elements and reduce the cost. It should be noted that there is no need for a thin plate for protecting a shim because the piston 17a has a relatively large wall thickness; therefore, if shims are incorporated according to need, generation of brake noise can be suppressed even more effectively.

Although the present invention has been described above by way of one example in which the wall thickness of the piston 17a is increased in order to set the natural frequency of the piston 17a outside the frequency range from 20 Hz to 20 kHz, it should be noted that the object of the present invention can also be attained by using a material of relatively high hardness for the piston 17a, or burying a reinforcing material in the cylindrical portion of the piston 17a to thereby enhance the rigidity of the piston cylindrical portion. However, when the wall thickness of the piston 17a is increased, the pad 4 can be pressed over a wider area. Accordingly, even when the pad 4 is worn and the bending rigidity thereof lowers, the pad 4 can be reliably pressed against the disc 3. Therefore, it is possible to suppress generation of brake noise caused by lowering of the bending rigidity of the pad 4.

FIG. 3 is a graph showing vibration characteristics of one example of the thick-walled piston 17a, which is made of steel and has an outer diameter of 43 mm, a wall thickness of 10 mm, and a bottom thickness of 11 mm. As will be clear from the graph, the natural frequency of the piston 17a is not present in the frequency range of from 1 kHz to 20 kHz, but falls within the frequency range exceeding 20 kHz (not shown).

Although in the first embodiment the present invention has been described by way of one example in which pads are pressed by one piston, it should be noted that the present invention may also be applied to an opposed two-pot type disc brake (not shown), in which pistons are disposed on both sides of a disc. In the opposed two-pot type disc brake, the natural frequency of at least one of the pistons is set outside the frequency range of from 20 Hz to 20 kHz.

Figure 4:
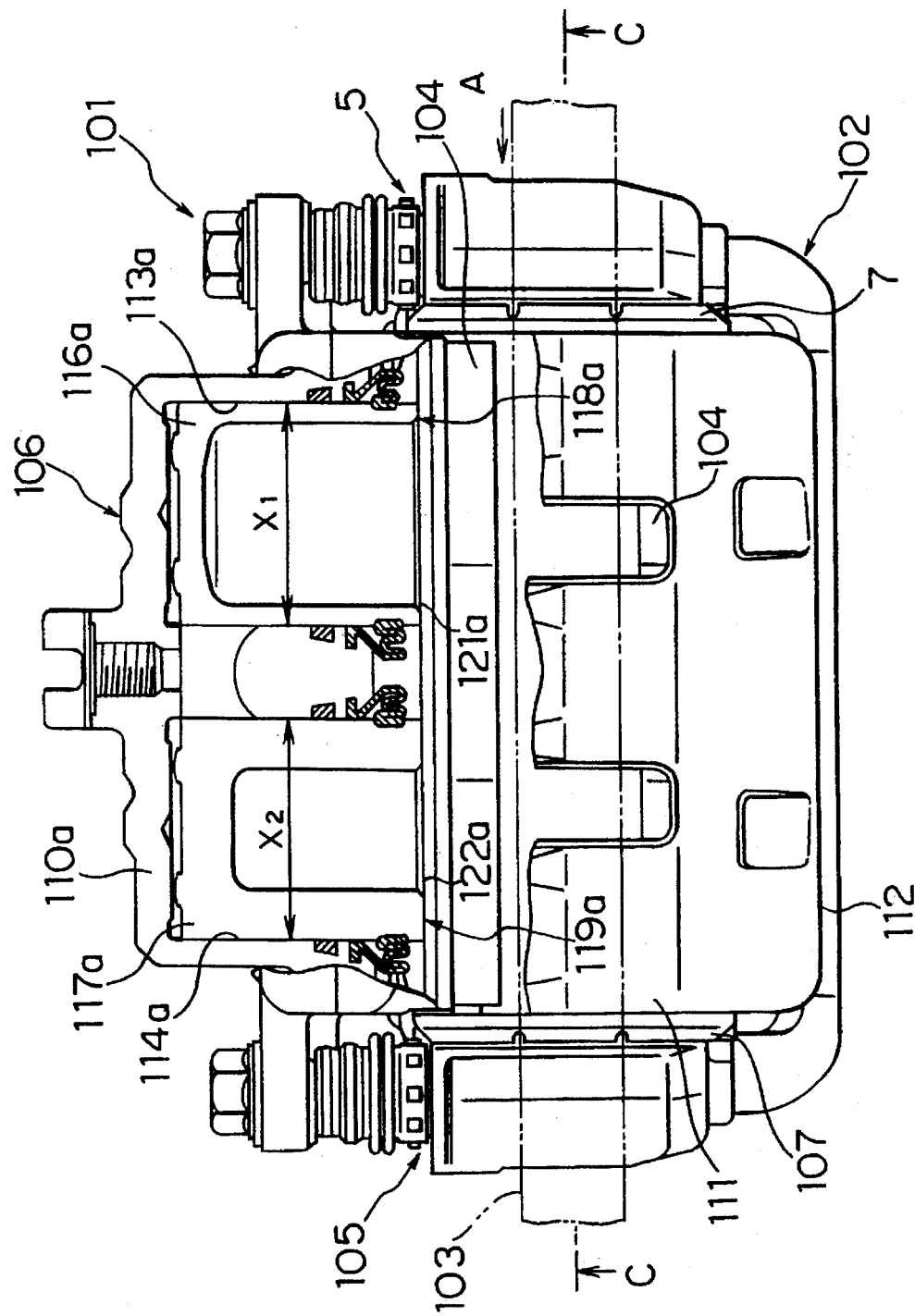
FIG. 4 is a partly-sectioned plan view showing a second embodiment of the disc brake according to the present invention.
Figure 5:
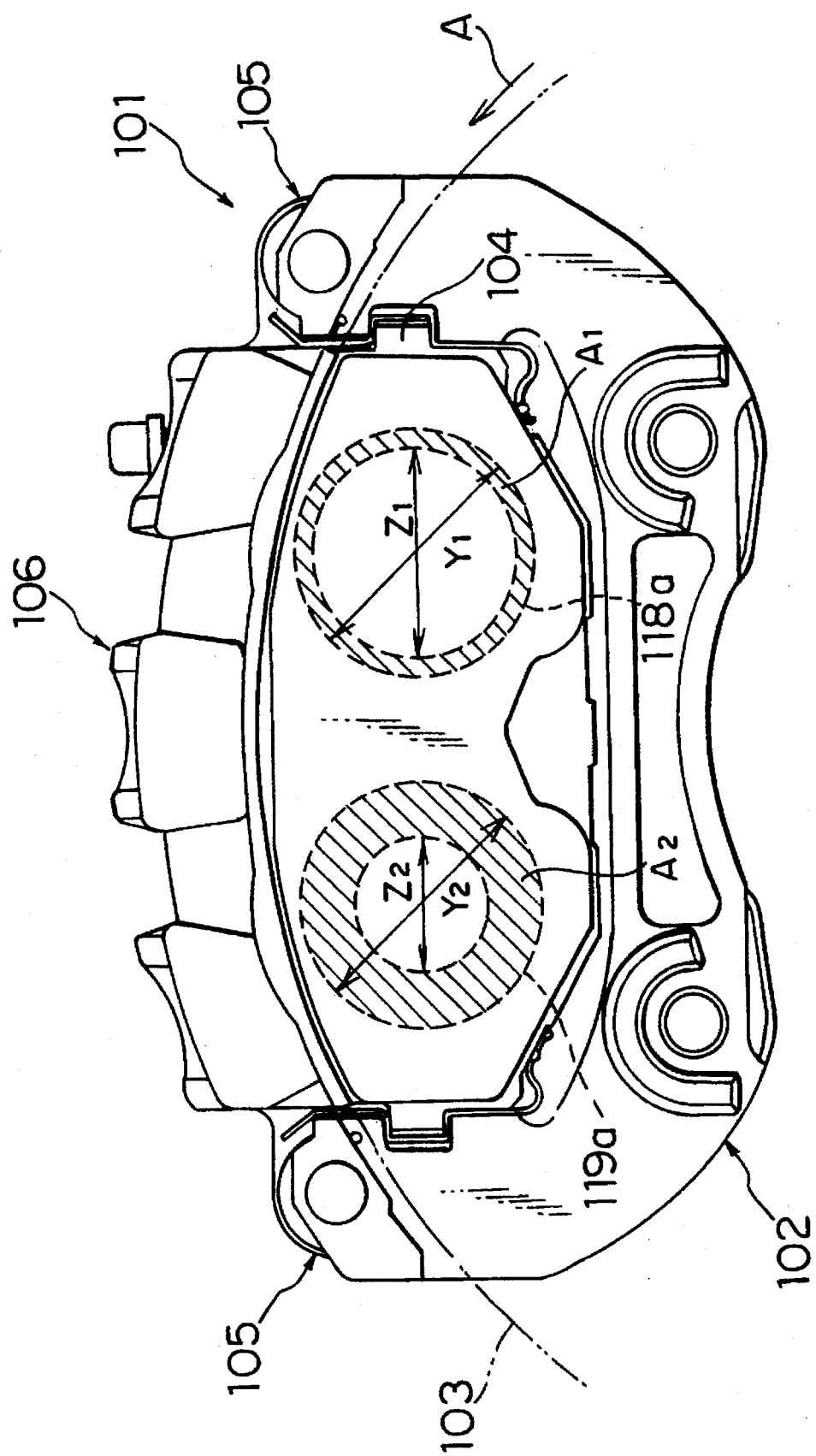
FIG. 5 is a sectional view as seen in the direction of the arrow C—C in FIG. 4, showing the second embodiment of the disc brake according to the present invention.

A second embodiment of the disc brake according to the present invention will be described below with reference to FIGS. 4 and 5. As shown in the figures, a disc brake 101 is composed mainly of a carrier 102 secured to a non-rotating part of a vehicle, a pair of pads 104 disposed on the carrier 102 so as to sandwich a disc 103 therebetween, and a caliper 106 supported on the carrier 102 so as to be slidable in the axial direction of the disc 103 through two slide guide portions 105. The two pads 104 are supported by a pair of opposed pad guides 107 provided at the respective inner sides of the slide guide portions 105 of the carrier 102 so that the pads 104 are slidable in the axial direction of the disc 103. The disc 103 rotates in the direction of the arrow A shown in the drawings.

The caliper 106 has a cylinder portion 110a disposed at one side of the disc 103 so as to face it, a disc-pass portion 111 extending from one end of the cylinder portion 110a across the outer peripheral portion of the disc 103, and a claw portion 112 extending from the outer end of the disc-pass portion 111 so as to face the other side of the disc 103.

The cylinder portion 110a is provided with two bores 113a and 114a, which have a circular cross-sectional configuration and are equal in diameter and depth to each other, such that the bores 113a and 114a opens to the disc 103. The bores 113a and 114a are provided in side-by-side relation along the circumferential direction of the disc 103 such that the axis of each bore extends parallel to the axis of the disc 103.

The bores 113a and 114a are slidably fitted with respective pistons 116a and 117a, each having the shape of a cylinder one end of which is closed, in such a manner that the bottom of each piston faces away from the disc 103. The outer diameter $X_1$ of the piston 116a, which is closer to the inlet side in the disc rotation direction (hereinafter referred to as "inlet-side piston"), and the outer diameter $X_2$ of the piston 117a, which is closer to the outlet side in the disc rotation direction (hereinafter referred to as "outlet-side piston"), are equal to each other. In addition, the overall lengths of the inlet- and outlet-side pistons 116a and 117a in the axial direction are equal to each other.

When brake fluid is introduced into a chamber defined between the inlet-side piston 116a and the bore 113a, the planar open end surface 118a of the inlet-side piston 116a comes in contact with the backing plate of the pad 104 which is opposite thereto. Similarly, when brake fluid is introduced into a chamber defined between the outlet-side piston 117a and the bore 114a, the planar open end surface 119a of the outlet-side piston 117a comes in contact with the backing plate of the pad 104 which is opposite thereto. As brake fluid is further introduced, the two pistons 116a and 117a clamp the two pads 104 from both sides in cooperation with the claw portion 112, thereby pressing the pads 104 toward the disc 103. Thus, the two pads 104 are brought into contact with the disc 103 to cause friction therebetween, thereby slowing the rotation of the wheel down to brake the vehicle.

In the second embodiment, the inner diameter of the outlet-side piston 117a is smaller than the inner diameter of the inlet-side piston 116a. The depth from the open end surface 119a to the bottom of the outlet-side piston 117a is also smaller than the depth from the open end surface 118a to the bottom of the inlet-side piston 116a. Thus, the outlet-side piston 117a has a greater wall thickness than that of the inlet-side piston 116a as a whole. Further, the inner peripheral edges of the open end surfaces 118a and 119a of the two pistons 116a and 117a are chamfered to the same extent to form respective chamfers 121a and 122a of the same size.

The outer diameter $Y_1$ of the open end surface 118a of the inlet-side piston 116a is equal to the outer diameter $Y_2$ of the open end surface 119a of the outlet-side piston 117a. The inner diameter $Z_1$ of the open end surface 118a of the inlet-side piston 116a is larger than the inner diameter $Z_2$ of the open end surface 119a of the outlet-side piston 117a. Accordingly, the area (pad pressing area) $A_2$ of the open end surface 119a of the outlet-side piston 117a, which is given by $A_2=(\pi/4)(Y_2^2-Z_2^2)$, is larger than the area (pad pressing area) $A_1$ of the open end surface 118a of the inlet-side piston 116a, which is given by $A_1=(\pi/4)(Y_1^2-Z_1^2)$. That is, the outlet-side piston 117a and the inlet-side piston 116a are different in pad pressing area from each other with respect to the radial direction thereof. It should be noted that, in the second embodiment, the inlet-side piston 116a has the same configuration as that of a piston used in the conventional disc brake shown in FIGS. 19 and 20.

If the above-described arrangement is applied to a disc brake in which vibration is likely to occur at end portions of the pads 104 which are closer to the outlet side in the disc rotation direction, since the pad pressing area of the outlet-side piston 117a is relatively large, it is possible to reduce vibration occurring at the outlet-side end portions of the pads 104 and hence possible to suppress generation of brake noise caused by the vibration.

Moreover, increasing the wall thickness of the outlet-side piston 117a makes it possible to set the natural frequency of the piston 117a outside the frequency range of from 20 Hz to 20 kHz, as has been described in regard to the first embodiment. Thus, even when the pads 104 cause vibration in the audible frequency range creating noise to some extent, the outlet-side piston 117a can be prevented from vibrating in resonance.

Vibration characteristics of one example of the thick-walled outlet-side piston 117a, which is made of steel and has an outer diameter of 43 mm, a wall thickness of 10 mm, and a bottom thickness of 11 mm, are the same as those shown in FIG. 3 in regard to the first embodiment. As will be clear from the graph, the natural frequency of the piston 117a is not present in the frequency range of from 1 kHz to 20 kHz, but falls within the frequency range exceeding 20 kHz (not shown).

In a case where the end portion of each pad 104 which is closer to the inlet side in the disc rotation direction is likely to cause stick-slip on the disc 103, the area of the open end surface 118a of the inlet-side piston 116a is made larger than the area of the open end surface 119a of the outlet-side piston 117a in reverse relation to the above-described arrangement, thereby enabling the inlet-side end portion of each pad 104 to be effectively and reliably pressed. By doing so, occurrence of stick-slip can be prevented, and thus brake noise can be reduced.

In the second embodiment, the pad pressing areas of the pistons 116a and 117a can be adjusted according to the type of cause of brake noise, as described above. Accordingly, generation of brake noise can be effectively suppressed. Moreover, since the bores 113a and 114a have the same configuration, the caliper 106 can be easily manufactured in the same way as in the case of the conventional disc brake. That is, the above-described advantages can be obtained simply by modifying the configuration of a piston.

It is preferable in the second embodiment that both the pistons 116a and 117a should be made of steel. However, the thick-walled piston 116a or 117a may be made of aluminum for the purpose of minimizing the weight.

Figure 6:
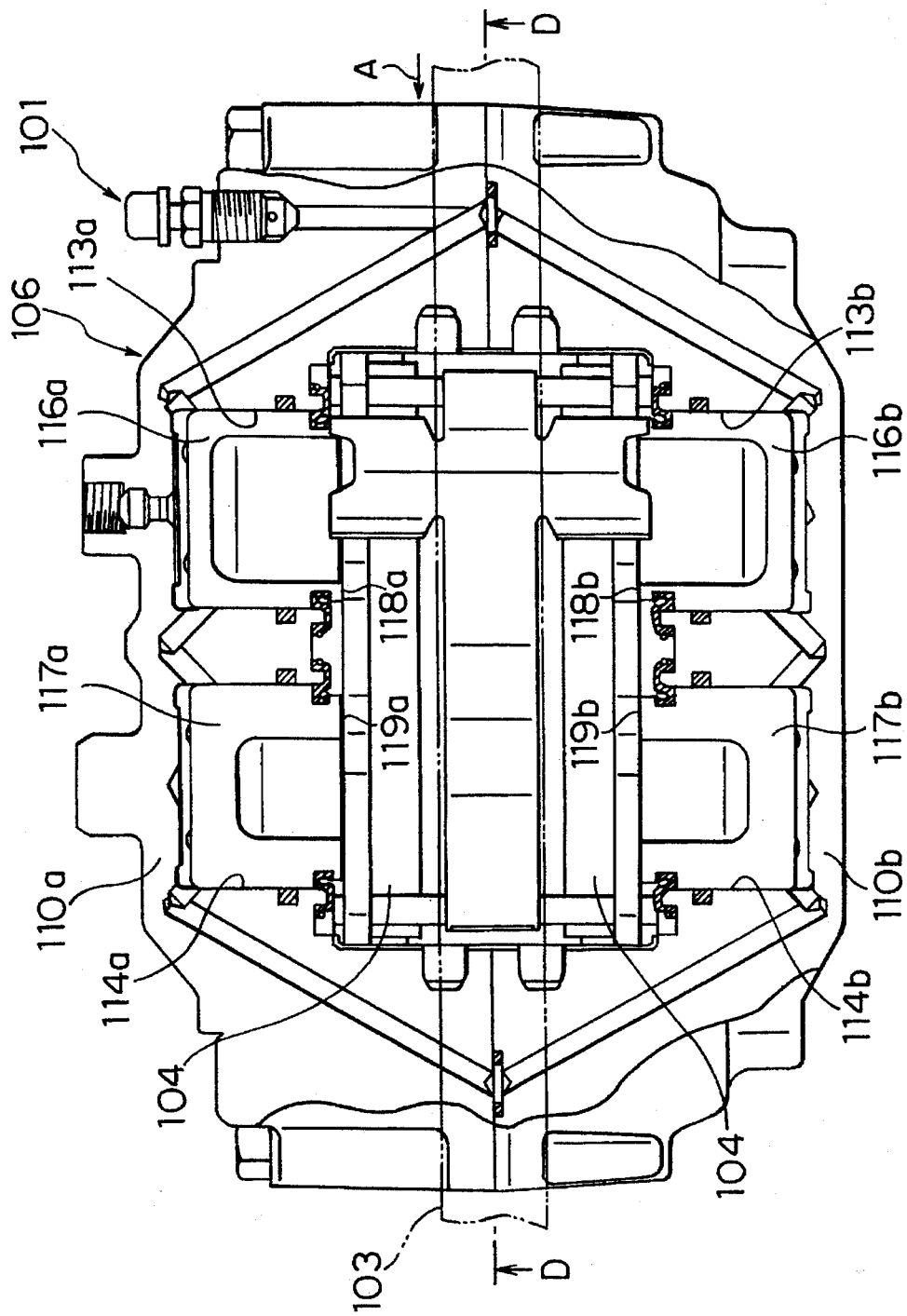
FIG. 6 is a partly-sectioned plan view showing a third embodiment of the disc brake according to the present invention.
Figure 7:
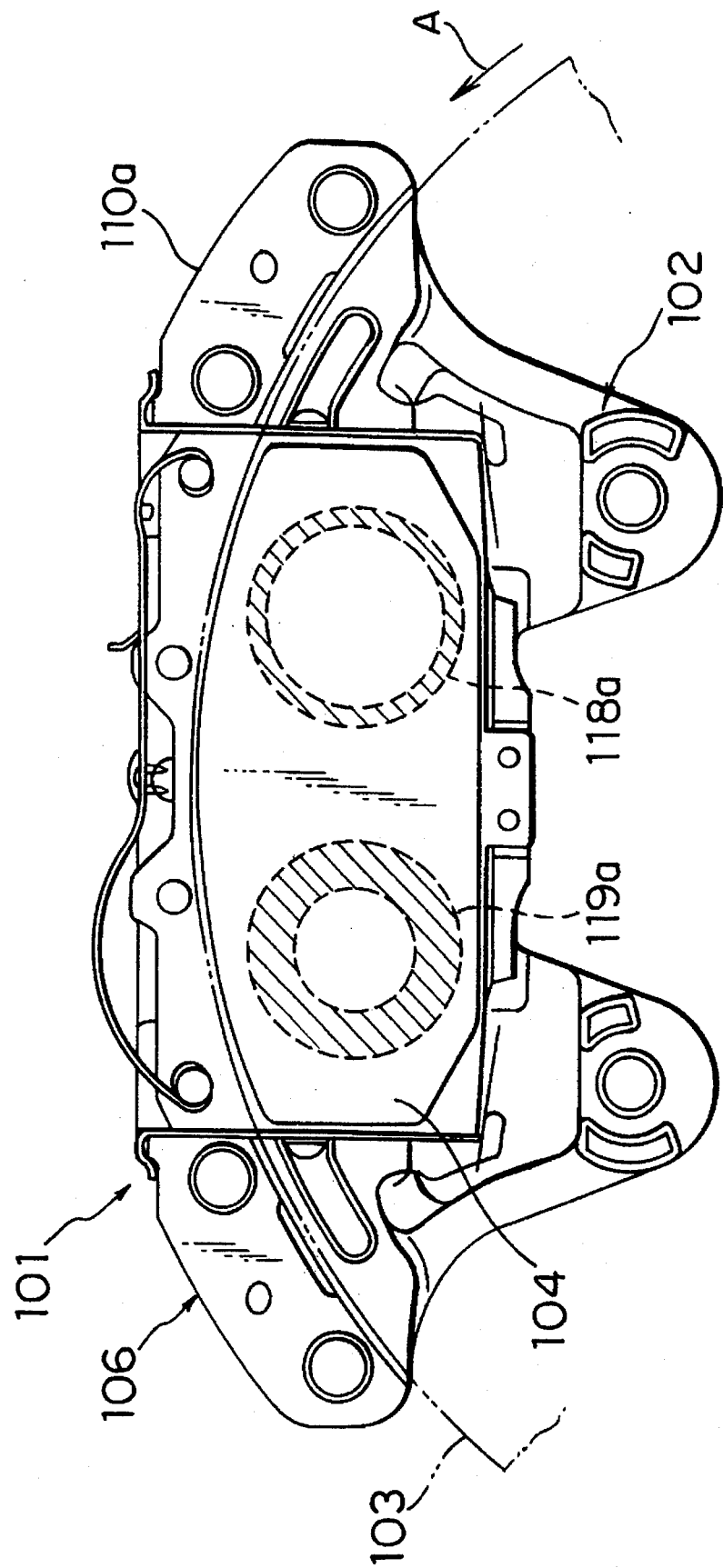
FIG. 7 is a sectional view as seen in the direction of the arrow D—D in FIG. 6, showing the third embodiment of the disc brake according to the present invention.

Although in the second embodiment the present invention has been described by way of one example in which the cylinder portion 110a of the caliper 106 is provided only at one side of the disc 103, it should be noted that the present invention may also be applied to an opposed-cylinder type disc brake (third embodiment) in which, as shown in FIGS. 6 and 7, the caliper 106 has another cylinder portion 110b at the other side of the disc 103. In the third embodiment, elements or portions which are substantially the same as those in the second embodiment are denoted by the same reference numerals.

In the opposed-cylinder type disc brake of the third embodiment, the caliper 106 has a cylinder portion 110b opposed to the cylinder portion 110a, and the cylinder 110b is also formed with bores 113b and 114b, which are coaxial with respect to the bores 113a and 114a and have the same diameter and depth as those of the bores 113a and 114a, in such a manner that the bores 113b and 114b open to the disc 103. The bores 113b and 114b are also fitted with respective pistons 116b and 117b. In the opposed-cylinder type caliper 106 also, the pad pressing areas of the open end surfaces 119a and 119b of the two outlet-side pistons 117a and 117b are made larger (or smaller) than the pad pressing areas of the open end surfaces 118a and 118b of the two inlet-side pistons 116a and 116b. With this arrangement, it is possible to obtain advantages similar to those offered by the second embodiment.

Although in the second and third embodiments the present invention has been described by way of one example in which the areas of the open end surfaces of a pair of pistons are varied from each other by making only the inner diameters of the open end surfaces different from each other with the outer diameters kept equal to each other, it is a matter of course that the areas of the open end surfaces may also be varied by making the outer diameters of the open end surfaces different from each other with the inner diameters kept equal to each other, for example, by varying the size of chamfer on the outer peripheral side. It is also possible to vary both the outer and inner diameters of the open end surfaces of the two pistons.

Figure 8:
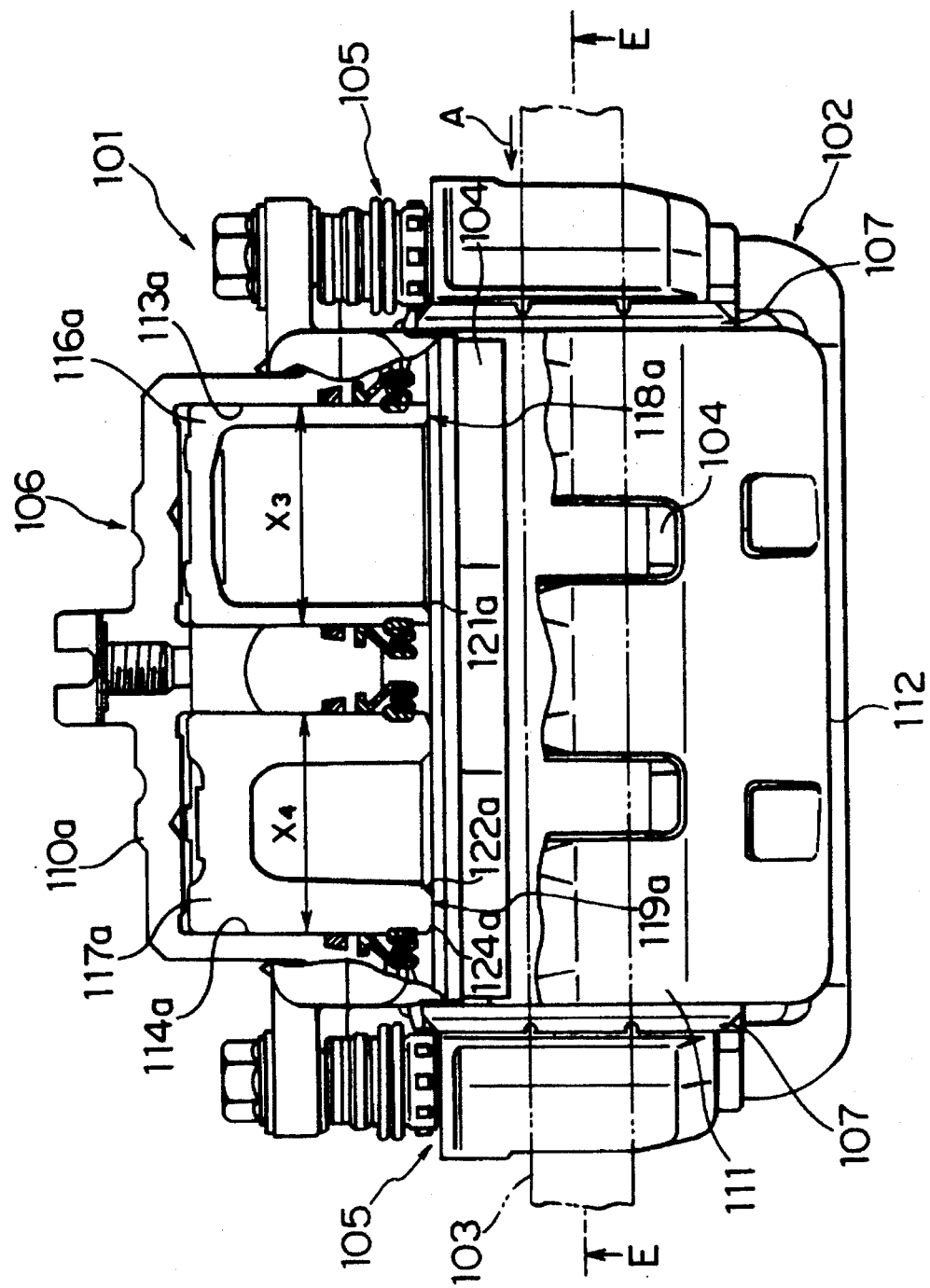
FIG. 8 is a partly-sectioned plan view showing a fourth embodiment of the disc brake according to the present invention.
Figure 9:
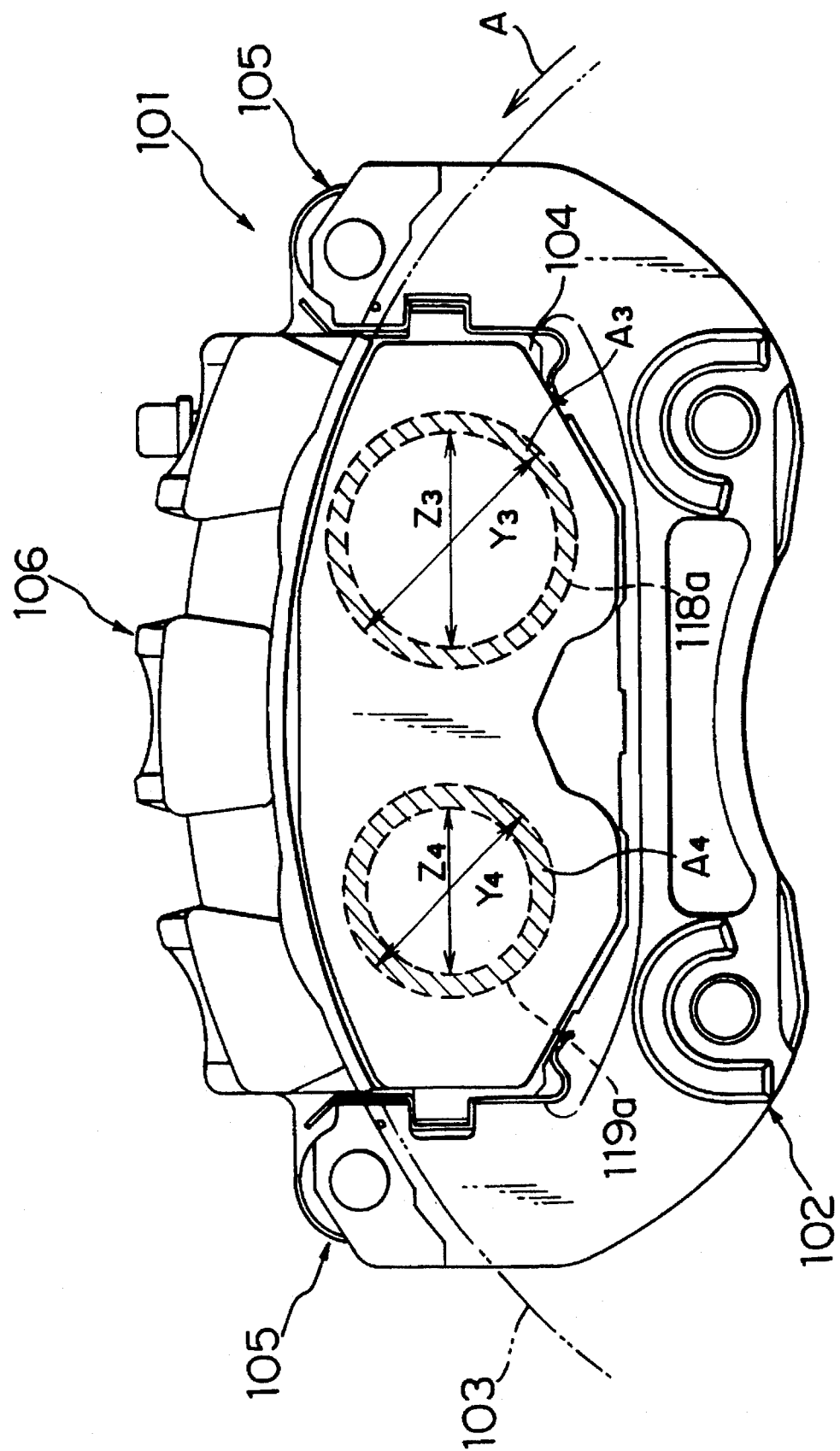
FIG. 9 is a sectional view as seen in the direction of the arrow E—E in FIG. 8, showing the fourth embodiment of the disc brake according to the present invention.

Next, a fourth embodiment of the disc brake according to the present invention will be described with reference to FIGS. 8 and 9 in regard mainly to portions in which the fourth embodiment differs from the second embodiment. It should be noted that, in the fourth embodiment, elements or portions which correspond to or are equal in nature to those in the second embodiment are denoted by the same reference numerals.

In the disc brake of the fourth embodiment, the outer diameter $X_3$ of the inlet-side piston 116a and the outer diameter $X_4$ of the outlet-side piston 117a are equal to each other. The inner diameter of the outlet-side piston 117a is smaller than the inner diameter of the inlet-side piston 116a. The depth from the open end surface 119a to the bottom of the outlet-side piston 117a is also smaller than the depth from the open end surface 118a to the bottom of the inlet-side piston 116a. Thus, the outlet-side piston 117a has a relatively large wall thickness as a whole.

The chamfer 122a formed on the inner peripheral edge of the open end surface 119a of the outlet-side piston 117a is larger than the chamfer 121a formed on the inner peripheral edge of the open end surface 118a of the inlet-side piston 116a. Further, a chamfer 124a is formed on the outer peripheral edge of the open end surface 119a of the outlet-side piston 117a.

The outer diameter $Y_3$ of the open end surface 118a of the inlet-side piston 116a is larger than the outer diameter $Y_4$ of the open end surface 119a of the outlet-side piston 117a, and the inner diameter $Z_3$ of the open end surface 118a of the inlet-side piston 116a is larger than the inner diameter $Z_4$ of the open end surface 119a of the outlet-side piston 117a.

Thus, the position (pad pressing position) of the open end surface 119a of the outlet-side piston 117a shifts to a position which is radially inward compared with the position (pad pressing position) of the open end surface 118a of the inlet-side piston 116a. It should be noted that, in the fourth embodiment, the inlet-side piston 116a has the same configuration as that of a piston used in the conventional disc brake shown in FIGS. 19 and 20.

If the above-described arrangement is applied to a disc brake in which the end portion of each pad 104 which is closer to the inlet side in the disc rotation direction is likely to cause stick-slip on the disc 103, occurrence of stick-slip can be prevented and thus brake noise can be reduced because the radial distance of the pad pressing portion of the open end surface 118a of the inlet-side piston 116a is made larger than that of the open end surface 119a of the outlet-side piston 117a, thereby enabling the inlet-side end portion of each pad 104 to be effectively and reliably pressed.

Moreover, in the fourth embodiment, the area $A_4$ of the open end surface 119a of the outlet-side piston 117a, which is given by $A_4=(\pi/4)(Y_4^2-Z_4^2)$, is made smaller than the area $A_3$ of the open end surface 118a of the inlet-side piston 116a, which is given by $A_3=(\pi/4)(Y_3^2-Z_3^2)$. Thus, the inlet-side piston 116a is larger than the outlet-side piston 117a in terms of pad pressing area in addition to pad pressing range. Accordingly, the inlet-side end portion of each pad 104 can be pressed even more effectively and reliably.

In a case where the above-described arrangement is applied to a disc brake in which vibration is likely to occur at the end portion of each pad 104 which is closer to the outlet side in the disc rotation direction, the radial distance of the pad pressing portion of the outlet-side piston 117a is made larger than that of the inlet-side piston 116a in reverse relation to the above-described arrangement, and, if necessary, the pad pressing area of the outlet-side piston 117a is also made larger than that of the inlet-side piston 116a. By doing so, it is possible to reduce vibration occurring at the outlet-side end portion of each pad 104 and hence possible to reduce brake noise caused by the vibration.

Thus, in the fourth embodiment also, the pad pressing positions of the pistons 116a and 117a can be adjusted according to the type of cause of brake noise, as described above. Accordingly, generation of brake noise can be effectively suppressed. Moreover, since the bores 113a and 114a have the same configuration, the caliper 106 can be easily manufactured in the same way as in the case of the conventional disc brake.

The thick-walled piston in the fourth embodiment may also be made of a resin material (e.g., a phenolic resin material).

Figure 10:
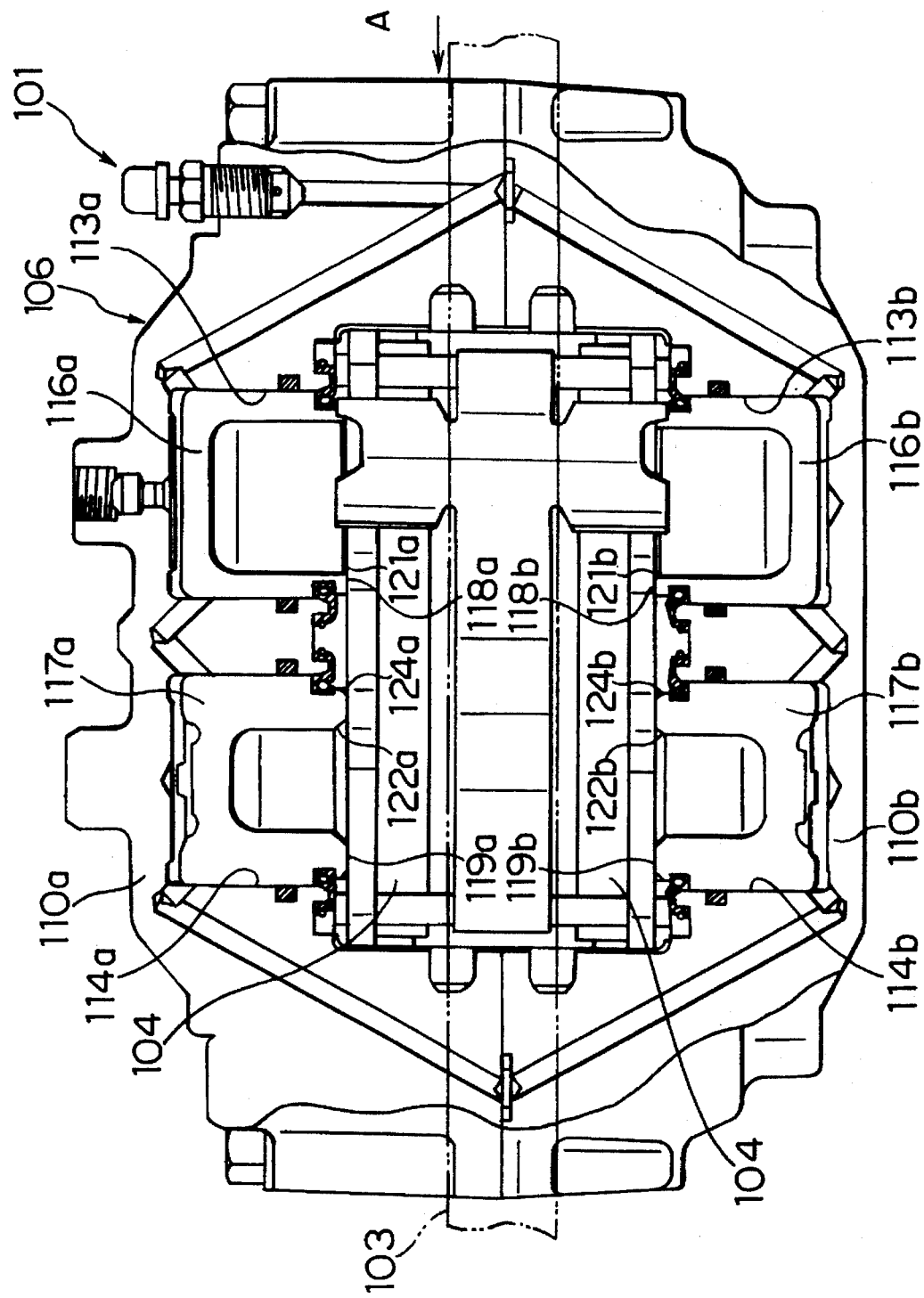
FIG. 10 is a partly-sectioned plan view showing a fifth embodiment of the disc brake according to the present invention.

Although in the fourth embodiment the present invention has been described by way of one example in which the cylinder portion 110a of the caliper 106 is provided only at one side of the disc 103, it should be noted that the present invention may also be applied to an opposed-cylinder type disc brake (fifth embodiment) in which, as shown in FIG. 10, the caliper 106 has another cylinder portion 110b at the other side of the disc 103.

The opposed-cylinder type caliper 106 in the fifth embodiment is roughly as follows: The caliper 106 has a cylinder portion 110b opposed to the cylinder portion 110a in the fourth embodiment, and the cylinder 110b is also formed with bores 113b and 114b, which are coaxial with respect to the bores 113a and 114a and have the same diameter and depth as those of the bores 113a and 114a, in such a manner that the bores 113b and 114b open to the disc 103. The bores 113b and 114b are also fitted with respective pistons 116b and 117b. In the opposed-cylinder type caliper 106 also, the open end surfaces 119a and 119b of the two outlet-side pistons 117a and 117b are shifted to respective positions which are radially inward compared with the positions of the open end surfaces 118a and 118b of the two inlet-side pistons 116a and 116b (or vice versa) by adjusting the wall thickness and the size of the inner and outer peripheral chamfer portions of each piston. With this arrangement, it is possible to obtain advantages similar to those offered by the fourth embodiment.

Although in the second to fifth embodiments the present invention has been described by way of one example in which two pistons are provided at one or each side of a disc, it should be noted that the present invention may also be applied to a disc brake having three or more pistons at one or each side of a disc. In such a case, at least one of a plurality of pistons provided at one or each side of the disc is made different from the others in pad pressing area and/or pad pressing position. By doing so, advantages similar to those described above can be obtained.

In the foregoing second to fifth embodiments, two pistons are arranged so that one piston has a relatively thick wall, while the other piston has a relatively thin wall, thereby varying them in natural frequency from each other. Accordingly, the mode of resonance of the combination of the pistons and the pads becomes unbalanced. Therefore, the brake noise suppressing performance can be improved furthermore.

Figure 11:
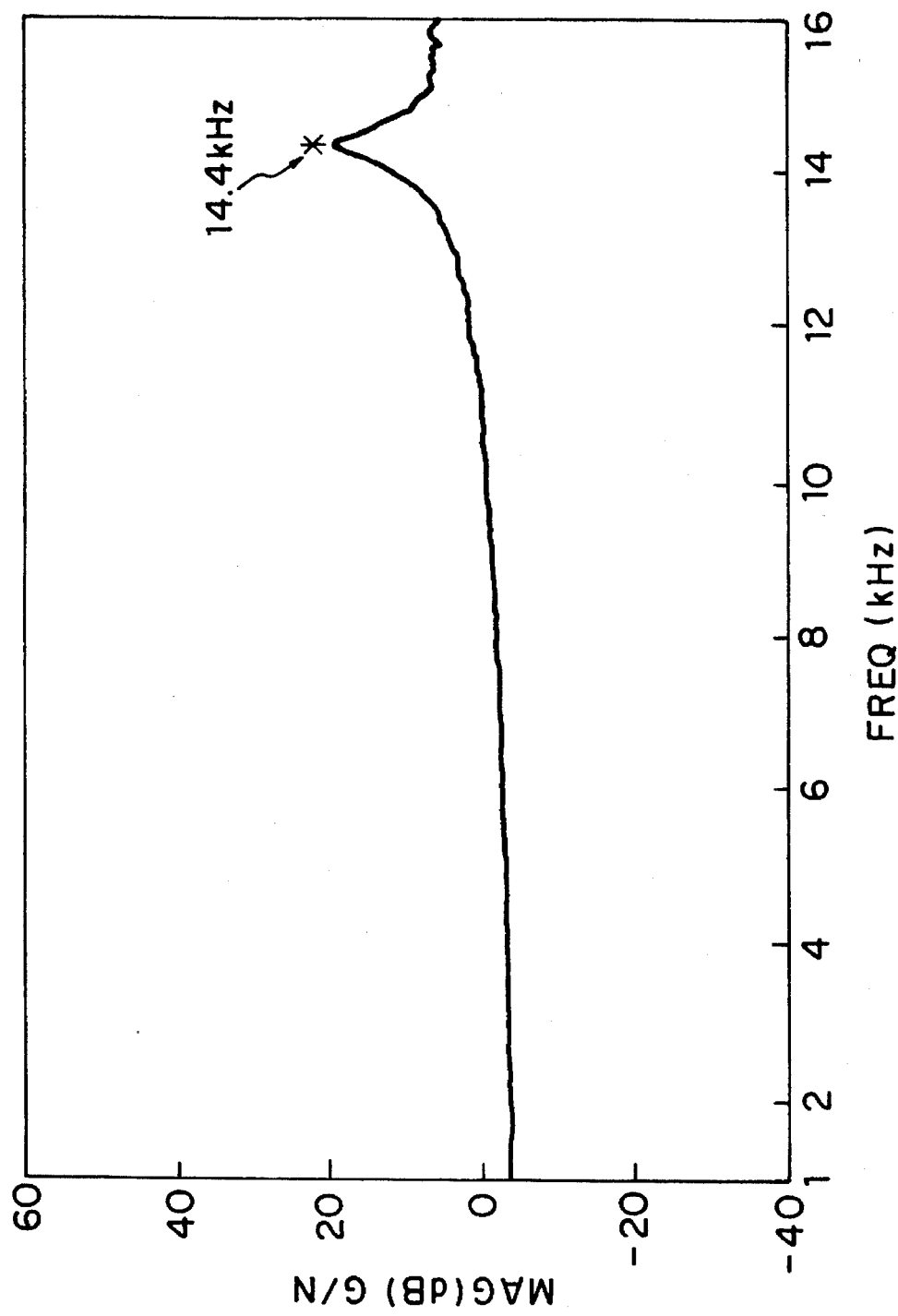
FIG. 11 is a graph showing vibration characteristics of a piston made of a phenolic resin material, which is used in the fourth embodiment of the disc brake according to the present invention.

The pistons may also be varied in natural frequency by employing different materials for all the pistons, e.g., a combination of aluminum and steel, a combination of aluminum and a phenolic material, etc., or by varying the pistons in overall length. For example, in the disc brake shown in FIGS. 8 and 9, the outlet-side piston 117a is a thick-walled piston made of a phenolic resin material. It should be noted that the natural frequency of the piston made of a phenolic resin material is 14.4 kHz, as shown for example in FIG. 11.

Figure 12:
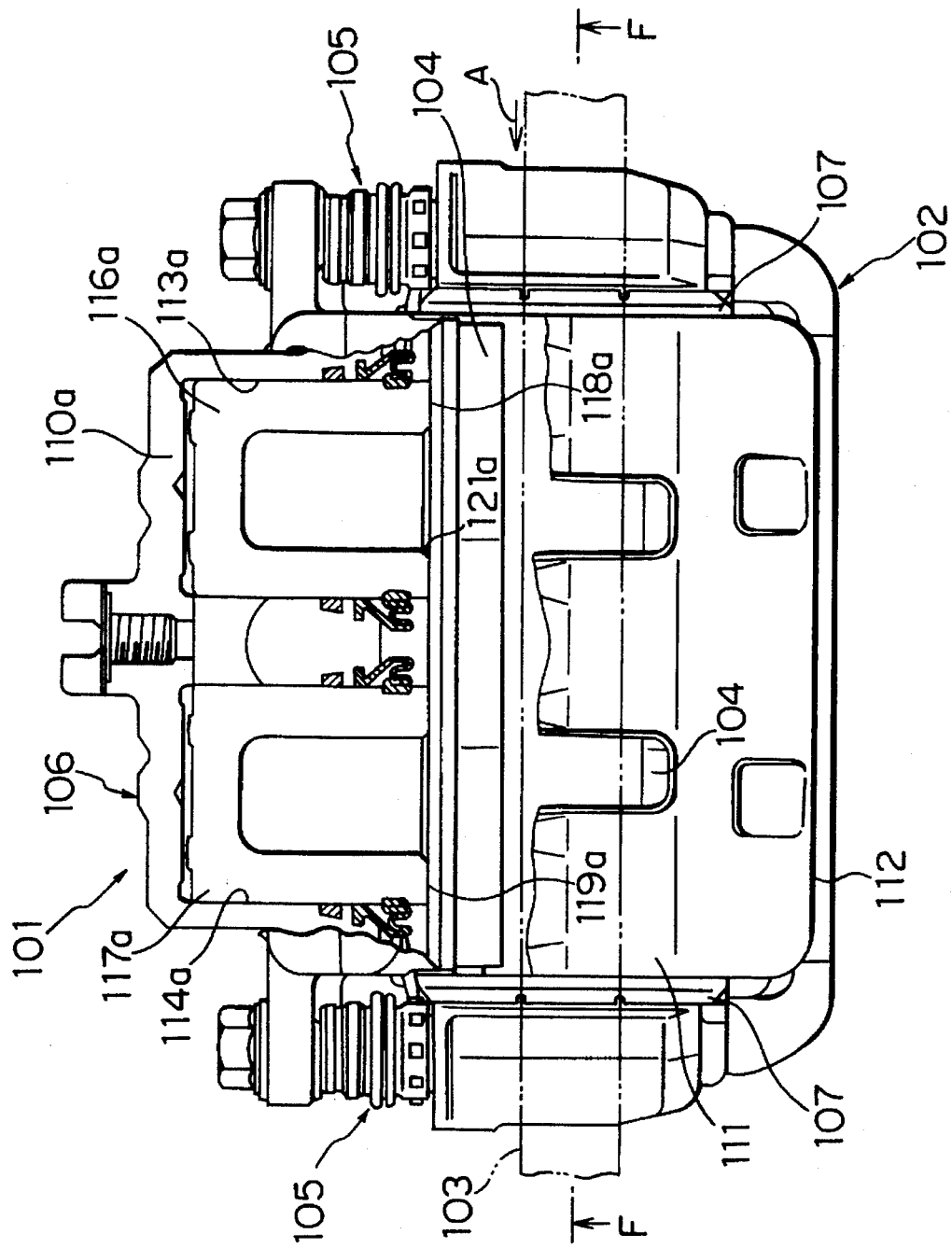
FIG. 12 is a partly-sectioned plan view showing a modification of the second embodiment of the disc brake according to the present invention.
Figure 13:
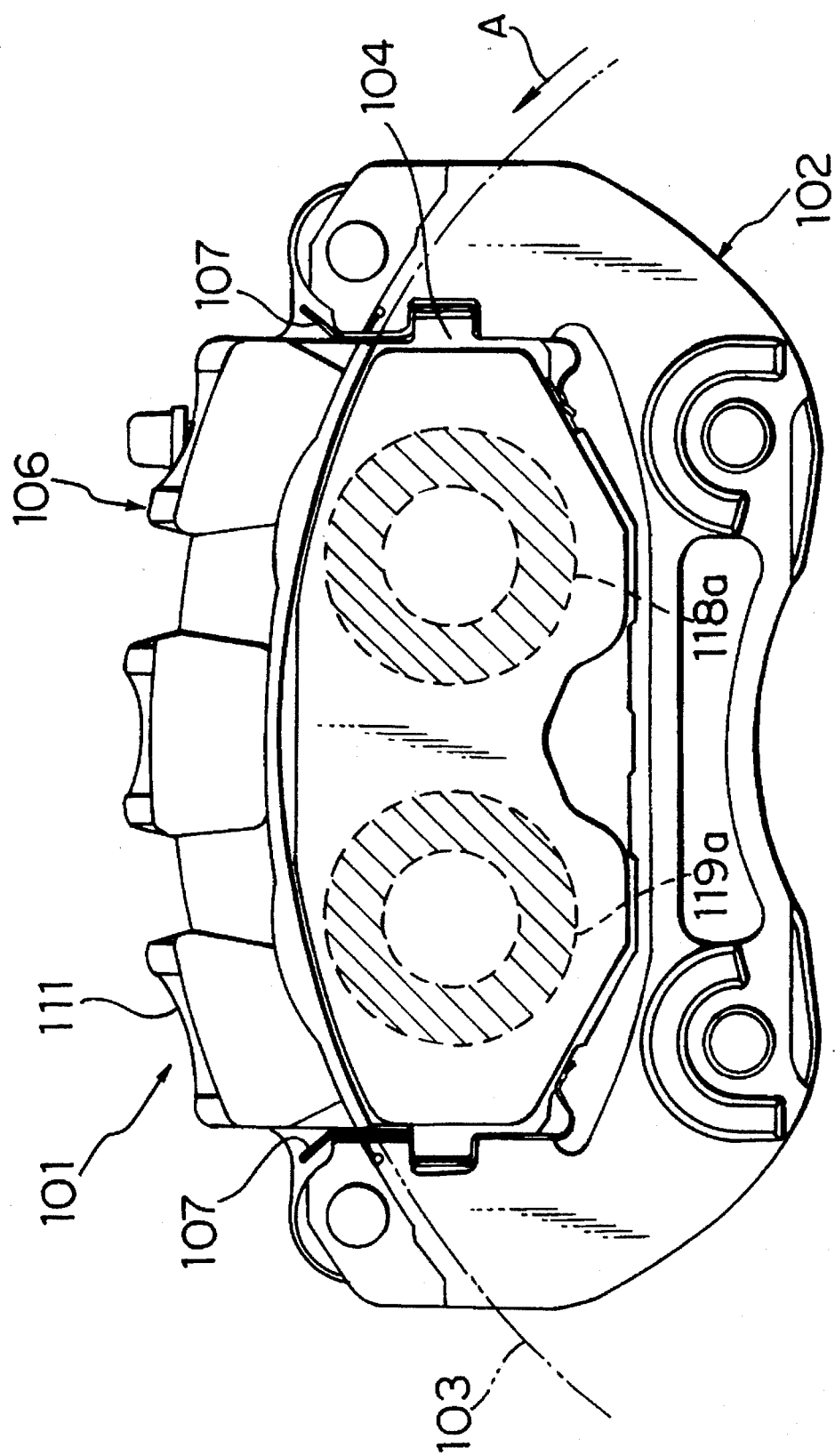
FIG. 13 is a sectional view as seen in the direction of the arrow F—F in FIG. 12.

It is also possible to form both the inlet- and outlet-side pistons 116a and 117a as thick-walled pistons, as shown in FIGS. 12 and 13. With this arrangement, vibration preventing measures can be taken for all the pistons, and brake noise can be prevented even more effectively and reliably.

It should be noted that the caliper 106 in the foregoing embodiments may be arranged as follows: Both the outlet-side pistons 117a and 117b are thin-walled, while both the inlet-side pistons 116a and 116b are thick-walled; only one of the outlet- and inlet-side pistons 117a, 117b, 116a and 116b is thick-walled; three of the outlet- and inlet-side pistons 117a, 117b, 116a and 116b are thick-walled; or all the outlet- and inlet-side pistons 117a, 117b, 116a and 116b are thick-walled.

Figure 14A:
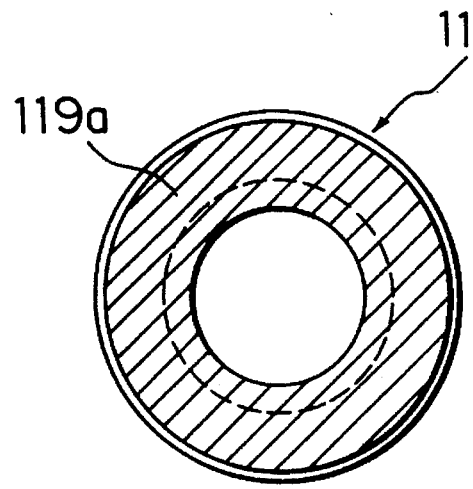
FIG. 14(a) is a front view of a modification of a piston used in the disc brake-according to the present invention.
Figure 14B:
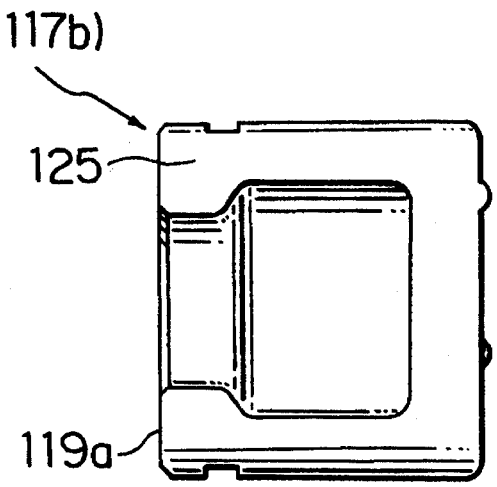
FIG. 14(b) is a sectional side view of the modification shown in FIG. 14(a) as seen from the right-hand side thereof.
Figure 15A:
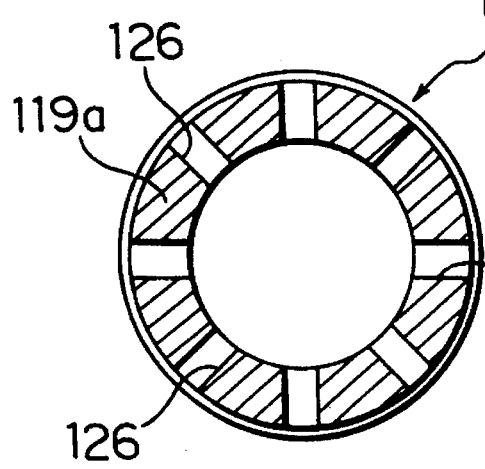
FIG. 15(a) is a front view of another modification of a piston used in the disc brake according to the present invention.
Figure 15B:
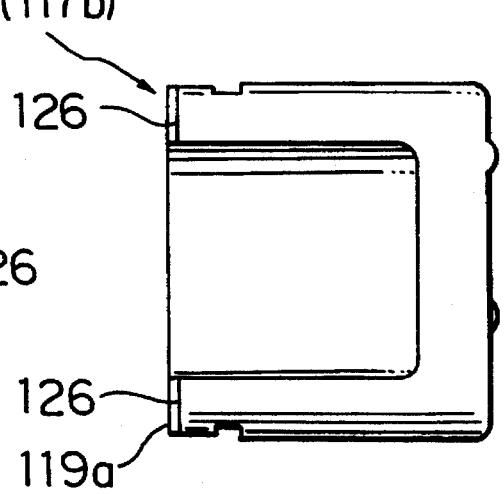
FIG. 15(b) is a sectional side view of the modification shown in FIG. 15(a) as seen from the right-hand side thereof.

It should be noted that the area of the open end surface 119a of the outlet-side thick-walled piston 117a (117b) can be increased by drawing the open end portion 125 of the outlet-side piston 117a inwardly, as shown in FIGS. 14(a) and 14(b) (in this case, it is preferable from the manufacturing point of view that the inner and outer peripheries of the open end portion 125 should be concentric with respect to each other). It is also possible to form radial grooves 126 on the open end surface 119a of the outlet-side piston 117a, as shown in FIGS. 15(a) and 15(b).

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A disk brake, comprising:

a disk;

a caliper having a portion extending across said disk and a first cylinder portion on one side of said disk having a plurality of cylinder bores of the same diameter and the same depth; and a plurality of pistons received in the respective said cylinder bores, each of said pistons comprising a circumferential wall;

wherein said plurality of pistons have the same outer diameter and wherein said circumferential wall of at least one of said plurality of pistons has a thickness that is different from the thickness of said circumferential walls of the others of said plurality of pistons;

wherein said caliper further comprises a second cylinder portion that is located on the other side of said disk, said second cylinder portion comprising a plurality of second cylinder bores of the same diameter and the same depth;

wherein said disk brake further comprises a plurality of second pistons received in said second cylinder bores of said second cylinder portion, each of said second pistons comprising a circumferential wall;

wherein said plurality of second pistons have the same outer diameter and wherein said circumferential wall of at least one of said plurality of second pistons has a thickness that is different from the thickness of said circumferential walls of the others of said plurality of second pistons; and wherein one of said plurality of pistons, having a thickest circumferential wall of said plurality of pistons, and one of said plurality of second pistons, having a thickest circumferential wall of said plurality of second pistons, have a natural frequency which is outside of the range of 20 Hz to 20 kHz.

2. A disk brake, comprising:

a disk;

a caliper having a portion extending across said disk and a first cylinder portion on one side of said disk having a plurality of cylinder bores of the same diameter and the same depth; and a plurality of pistons received in the respective said cylinder bores, each of said pistons comprising a circumferential wall;

wherein said plurality of pistons have the same outer diameter and wherein said circumferential wall of at least one of said plurality of pistons has a thickness that is different from the thickness of said circumferential walls of the others of said plurality of pistons wherein said disk has a disk movement direction corresponding to forward movement and said first cylinder portion has an inlet end and an outlet end with respect to the disk movement direction;

wherein said circumferential wall of the one of said plurality of pistons located closest to said outlet end of said first cylinder portion has a thickness greater than the thickness of said circumferential wall of the one of said plurality of pistons located closest to said inlet end of said first cylinder portion; and wherein the one of said plurality of pistons located closest to said outlet end has a natural frequency which is outside of the range of 20 Hz to 20 kHz.

* * * * *